(12) United States Patent
Karpagavinayagam et al.

(10) Patent No.: US 10,509,656 B2
(45) Date of Patent: Dec. 17, 2019

(54) TECHNIQUES OF PROVIDING POLICY OPTIONS TO ENABLE AND DISABLE SYSTEM COMPONENTS

(71) Applicant: American Megatrends International, LLC, Norcross, GA (US)

(72) Inventors: Manickavasakam Karpagavinayagam, Norcross, GA (US); Manish Jha, Norcross, GA (US); Harikrishna Doppalapudi, Norcross, GA (US); Purandhar Nallagatla, Johns Creek, GA (US); Chandrasekar Rathineswaran, Cumming, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 74 days.

(21) Appl. No.: 15/828,864

(22) Filed: Dec. 1, 2017

(65) Prior Publication Data
US 2019/0171464 A1 Jun. 6, 2019

(51) Int. Cl.
*G06F 9/4401* (2018.01)

(52) U.S. Cl.
CPC .......... *G06F 9/4411* (2013.01); *G06F 9/4403* (2013.01)

(58) Field of Classification Search
CPC .............................. G06F 9/4411; G06F 9/4403
See application file for complete search history.

(56) References Cited

U.S. PATENT DOCUMENTS

| | | | |
|---|---|---|---|
| 8,621,118 B1* | 12/2013 | Nulkar | G06F 11/26 710/15 |
| 2009/0013258 A1* | 1/2009 | Hintermeister | G06F 11/328 715/736 |
| 2014/0365641 A1* | 12/2014 | Cho | G06F 13/4022 709/224 |
| 2015/0195191 A1* | 7/2015 | Inoue | G06F 15/17362 709/239 |

* cited by examiner

*Primary Examiner* — Terrell S Johnson
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes an initialization component of a host. The initialization component determines presence or absence of a plurality of hardware components of the host. The initialization component further generates a first series of indicators indicating the determined presence or absence of the plurality of hardware components. The initialization component sends, to a service processor of the host, a message in accordance with a management protocol, the message including the first series of indicators.

20 Claims, 6 Drawing Sheets

TECHNIQUES OF PROVIDING POLICY OPTIONS TO ENABLE AND DISABLE SYSTEM COMPONENTS

BACKGROUND

Field

The present disclosure relates generally to computer systems, and more particularly, to a service processor and an initialization component of a host that may operate together to enable and disable system components of the host.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

In one aspect of the present disclosure, a host may have certain defective hardware components that should be disabled during a boot. Accordingly, there is a need for a mechanism with which a service processor of the host can inform the host of enablement or disablement of the hardware components during a boot.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes an initialization component of a host. The initialization component determines presence or absence of a plurality of hardware components of the host. The initialization component further generates a first series of indicators indicating the determined presence or absence of the plurality of hardware components. The initialization component sends, to a service processor of the host, a message in accordance with a management protocol, the message including the first series of indicators.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
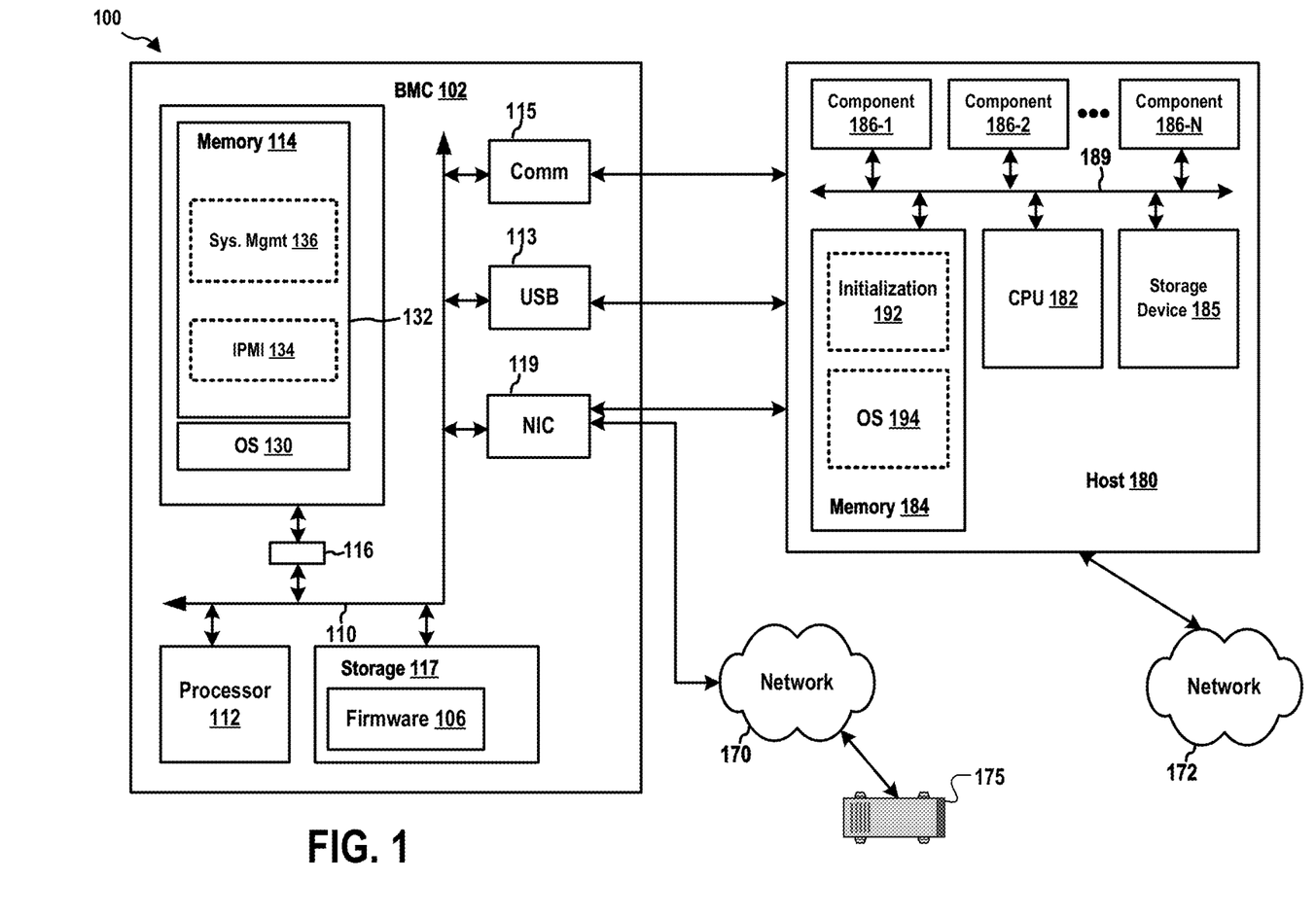
FIG. 1 is a diagram illustrating a computer system.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a Universal Serial Bus (USB) interface 113, and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an operating system (OS) 130 and service components 132. The service components 132 includes, among other components, IPMI services 134 and a system management component 136. Further, the service components 132 may be implemented as a service stack. As such, the BMC firmware 106 can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, and hardware components 186-1 to 186-N. The hardware components 186-1 to 186-N can be any suitable type of hardware components that are installed on the host computer 180, including additional CPUs, memories, and storage devices. As a further example, the hardware components 186-1 to 186-N can also include Peripheral Component Interconnect Express (PCIe) devices. Further, the hardware components 186-1 to 186-N can include hardware components of a computer 602 shown in FIG. 6.

After the host computer 180 is powered on, the host CPU 182 loads an initialization component 192 (e.g., a basic input/output system (BIOS)) from the storage device 185 into the host memory 184 and executes the initialization component 192. The initialization component 192, among other things, performs hardware initialization during the booting process (power-on startup). For example, the initialization component 192 can perform a Power On System Test, or Power On Self Test, (POST). The POST is used to initialize the standard system components, such as system timers, system direct memory access (DMA) controllers, system memory controllers, system I/O devices and video hardware (which are part of the hardware components 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
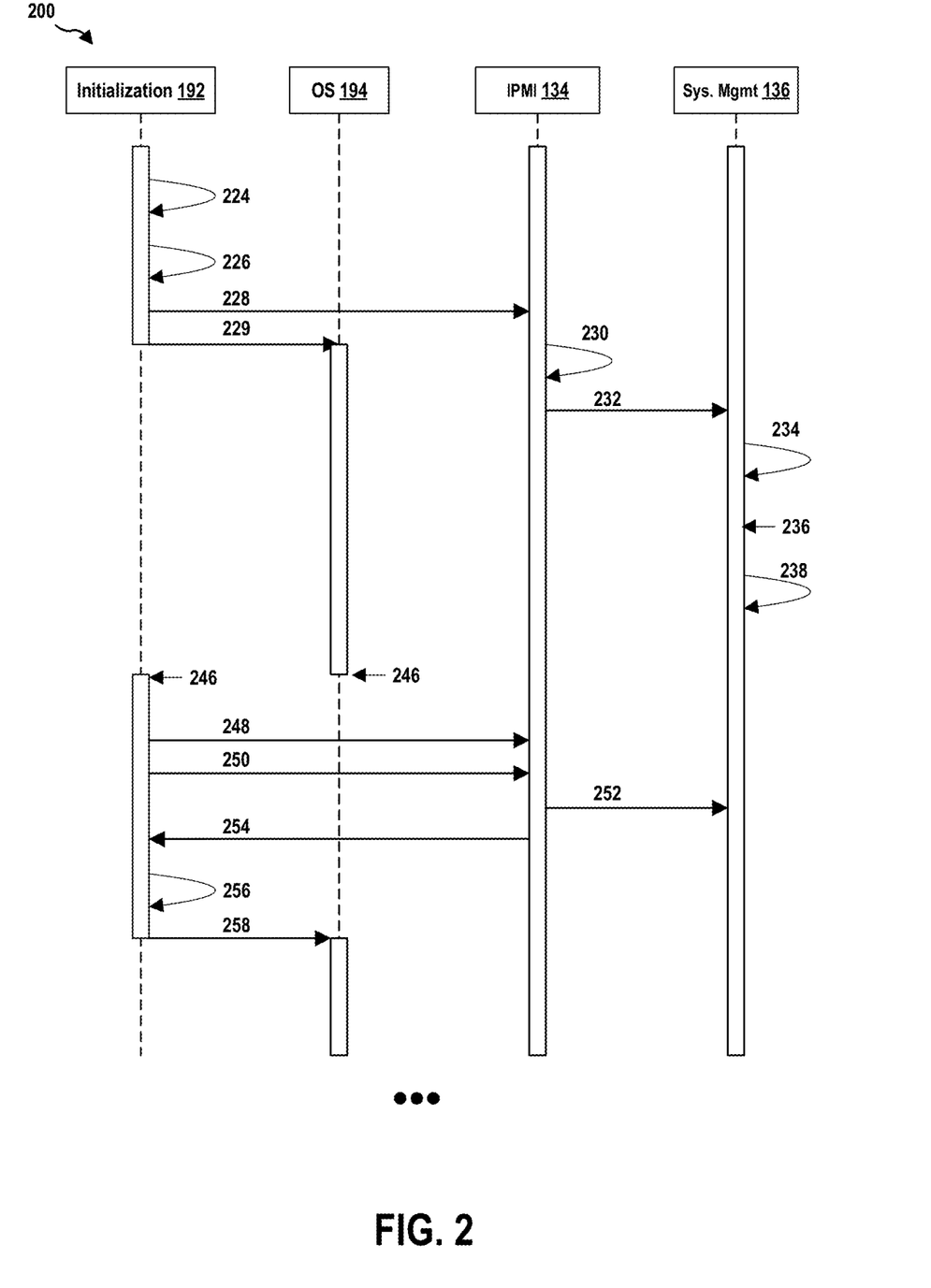
FIG. 2 is a diagram a sequence of procedures performed by the computer system.

FIG. 2 is a diagram 200 illustrating a sequence of procedures performed by the computer system 100. In procedure 222, the host computer 180 is powered on or reset. Accordingly, initialization component 192 starts an initialization process. The initialization component 192 may be configured with, or may be able to determine, an inventory list of the hardware components that may be installed (e.g., the host CPU 182, the host memory 184, the storage device 185, and the hardware components 186-1 to 186-N) on the host computer 180.

Figure 3:
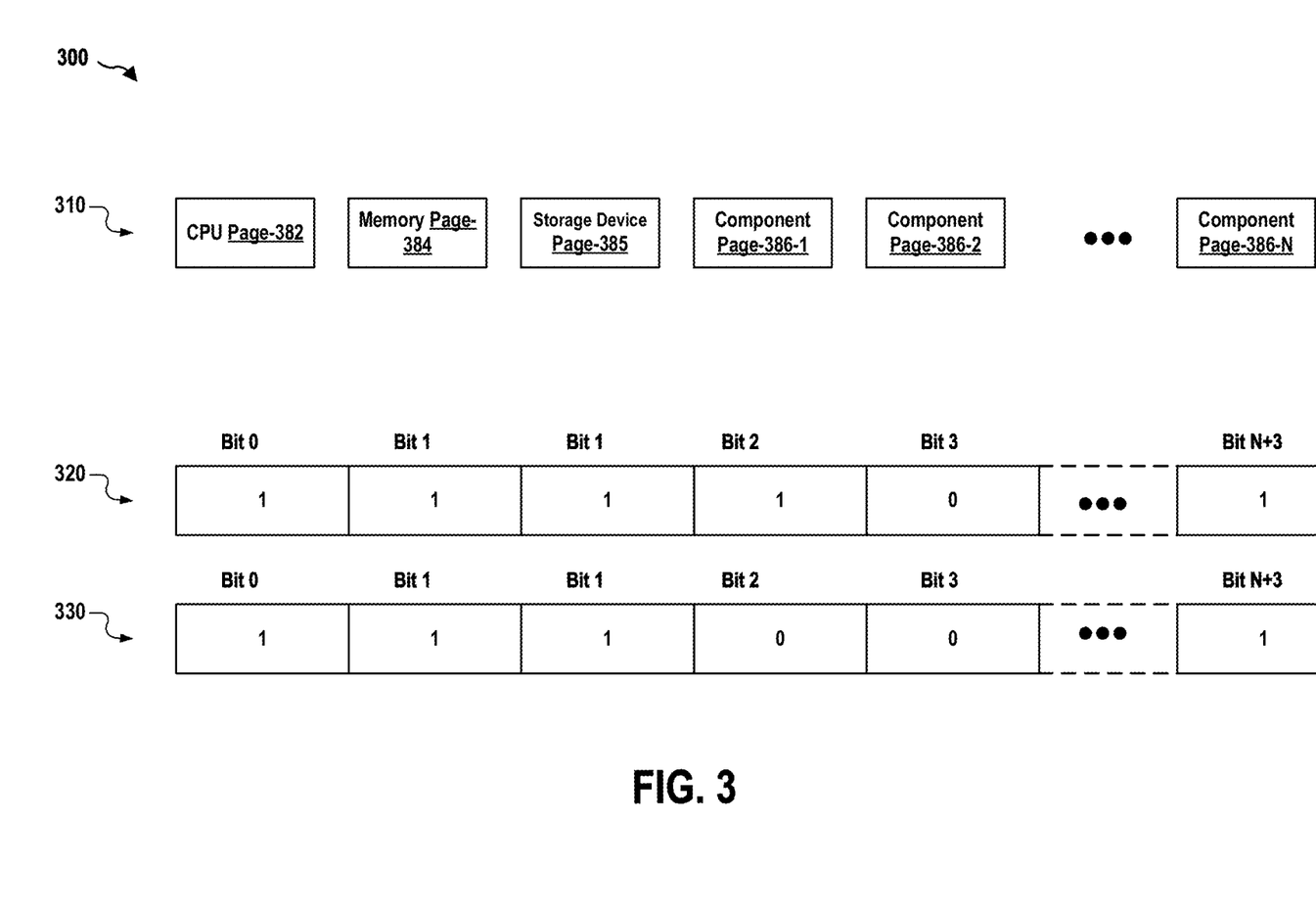
FIG. 3 is a diagram illustrating a presence-or-absence bitmap and an enablement-or-disablement bitmap corresponding to hardware components of a host.

In procedure 224, the initialization component 192 can perform the POST and other routines on the hardware components of the host computer 180, which includes the host CPU 182, the host memory 184, the storage device 185, and the hardware components 186-1 to 186-N. In particular, initialization component 192 can detect whether each of the all hardware component that may be installed on the host computer 180 is indeed installed on the host computer 180. As such, the initialization component 192 can determine the presence or absence of each of the hardware components on the inventory list. Further, the inventory list specifying the hardware components may have a particular predetermined order. FIG. 3 is a diagram 300 illustrating a presence-or-absence bitmap 320 and an enablement-or-disablement bitmap 330 corresponding to a particular order 310 of the hardware components of the host computer 180. The inventory list for the host computer 180 in this example has the particular order 310.

In procedure 226, the initialization component 192 generates the presence-or-absence bitmap 320. The number of bits in the presence-or-absence bitmap 320 is the number of hardware components in the host CPU 182, the host memory 184, the storage device 185, and the hardware components 186-1 to 186-N. The bits in the presence-or-absence bitmap 320 represent the host CPU 182, the host memory 184, the storage device 185, and the hardware components 186-1 to 186-N in the order 310. Further, the value of each bit indicates the presence or absence of the corresponding hardware component. For example, the value 1 may indicate that a corresponding hardware component is present on the host computer 180, while the value 0 may indicate that a corresponding hardware component is absent from the host computer 180.

The initialization component 192 is implemented with one or more management protocols (e.g., IPMI). Accordingly, in procedure 228, the initialization component 192 can establish a communication channel with the BMC 102 in accordance with a management protocol. The initialization component 192 subsequently can use a message defined by the management protocol to send the presence or absence data to the BMC 102. In this example, the initialization component 192 constructs an IPMI original equipment manufacturer (OEM) set command according to IPMI. The IPMI OEM set command carries the presence-or-absence bitmap 320. The IPMI OEM set command instructs the BMC 102 to set the presence-or-absence bitmap 320 carried in the IPMI OEM set command at the BMC 102. Subsequently, the initialization component 192 sends the IPMI OEM set command carrying the presence-or-absence bitmap 320 to the BMC 102.

In procedure 230, upon receiving the IPMI OEM set command, the IPMI services 134 of the BMC 102 process the IPMI OEM set command and determines that this command instructs the BMC 102 to set the presence-or-absence bitmap 320 carried in the command at the BMC 102. Accordingly, the IPMI services 134 extract the presence-or-absence bitmap 320 from the IPMI OEM set command. In procedure 232, the IPMI services 134 send the presence-or-absence bitmap 320 to the system management component 136.

The system management component 136 is configured with the inventory list of the host computer 180. Therefore, upon receiving the presence-or-absence bitmap 320, the system management component 136, in procedure 234, can determine the presence or absence of each of the hardware component on the inventory list. The system management component 136 can further store that information in a data store. As such, other devices or users can query the system management component 136 to obtain presence or absence information of the hardware components of the host computer 180. Further, the system management component 136 may have access to the health data of the host CPU 182, the host memory 184, the storage device 185, and the hardware components 186-1 to 186-N. The system management component 136 may determine, based on the health data, that one or more of those hardware components are defective and should be disabled in the next boot of the host computer 180.

In certain configurations, after obtaining the presence or absence information of the hardware components of the host computer 180, other devices or users can, in procedure 236, inform the system management component 136 that one or more of the present hardware components of the host computer 180 are to be disabled in the next boot of the host computer 180 (e.g., due to defects of the hardware components).

In procedure 238, the system management component 136 may generate the enablement-or-disablement bitmap 330 shown in FIG. 3 based on the inventory list (with the order 310) of the host computer 180. The enablement-or-disablement bitmap 330 is similar to the presence-or-absence bitmap 320. In particular, the number of bits in the enablement-or-disablement bitmap 330 is the number of hardware components in the host CPU 182, the host memory 184, the storage device 185, and the hardware components 186-1 to 186-N (as listed in the inventory list). The bits in the enablement-or-disablement bitmap 330 represent the host CPU 182, the host memory 184, the storage device 185, and the hardware components 186-1 to 186-N in the order 310. Further, the value of each bit indicates the enablement or disablement of the corresponding hardware component.

For example, the value 1 may indicate that a corresponding hardware component is to be enabled on the host computer 180, while the value 0 may indicate that a corresponding hardware component is to be disabled on the host computer 180. The system management component 136 may store the generated enablement-or-disablement bitmap 330 in a data store or other location of the BMC 102.

On the other hand, subsequent to sending the IPMI OEM set command to the BMC 102, the initialization component 192, in procedure 229, loads the OS 194. Accordingly, the OS 194 operates to allocate the resources of the host computer 180.

In procedure 246, the host computer 180 may be reset. Accordingly, the OS 130 terminates and the initialization component 192 is executed again at the host computer 180. Further, similar to what was described supra, the initialization component 192 may, in procedure 248, detect the presence or absence of the host CPU 182, the host memory 184, the storage device 185, and the hardware components 186-1 to 186-N, and send a presence-or-absence bitmap 320 to the BMC 102.

In procedure 250, the initialization component 192 can construct an IPMI OEM get command according to IPMI. The IPMI OEM get command instructs the BMC 102 to return the enablement-or-disablement bitmap 330, if generated, to the initialization component 192. The initialization component 192 sends the IPMI OEM get command to the BMC 102.

In procedure 252, upon receiving the IPMI OEM get command, the IPMI services 134 of the BMC 102 process the IPMI OEM get command and determine that this command instructs the BMC 102 to get the enablement-or-disablement bitmap 330 generated for the host computer 180 and to send the enablement-or-disablement bitmap 330 to the BMC 102. Accordingly, the IPMI services 134 obtain the generated enablement-or-disablement bitmap 330 from the system management component 136.

In procedure 254, the IPMI services 134 construct an IPMI response and include the enablement-or-disablement bitmap 330 in the IPMI response. Then, the IPMI services 134 send the IPMI response to the initialization component 192.

In procedure 256, upon receiving the IPMI response, the initialization component 192 extracts the enablement-or-disablement bitmap 330 from the IPMI response. Subsequently, the initialization component 192 enables or disables the host CPU 182, the host memory 184, the storage device 185, and the hardware components 186-1 to 186-N in accordance with the enablement-or-disablement bitmap 330. For example, the initialization component 192 may disable a network interface card (NIC) and a memory module. In particular, the initialization component 192 only initiates the hardware components that are present and enabled, skipping the disabled hardware components. In procedure 258, the initialization component 192 loads the OS 194 again.

Figure 4:
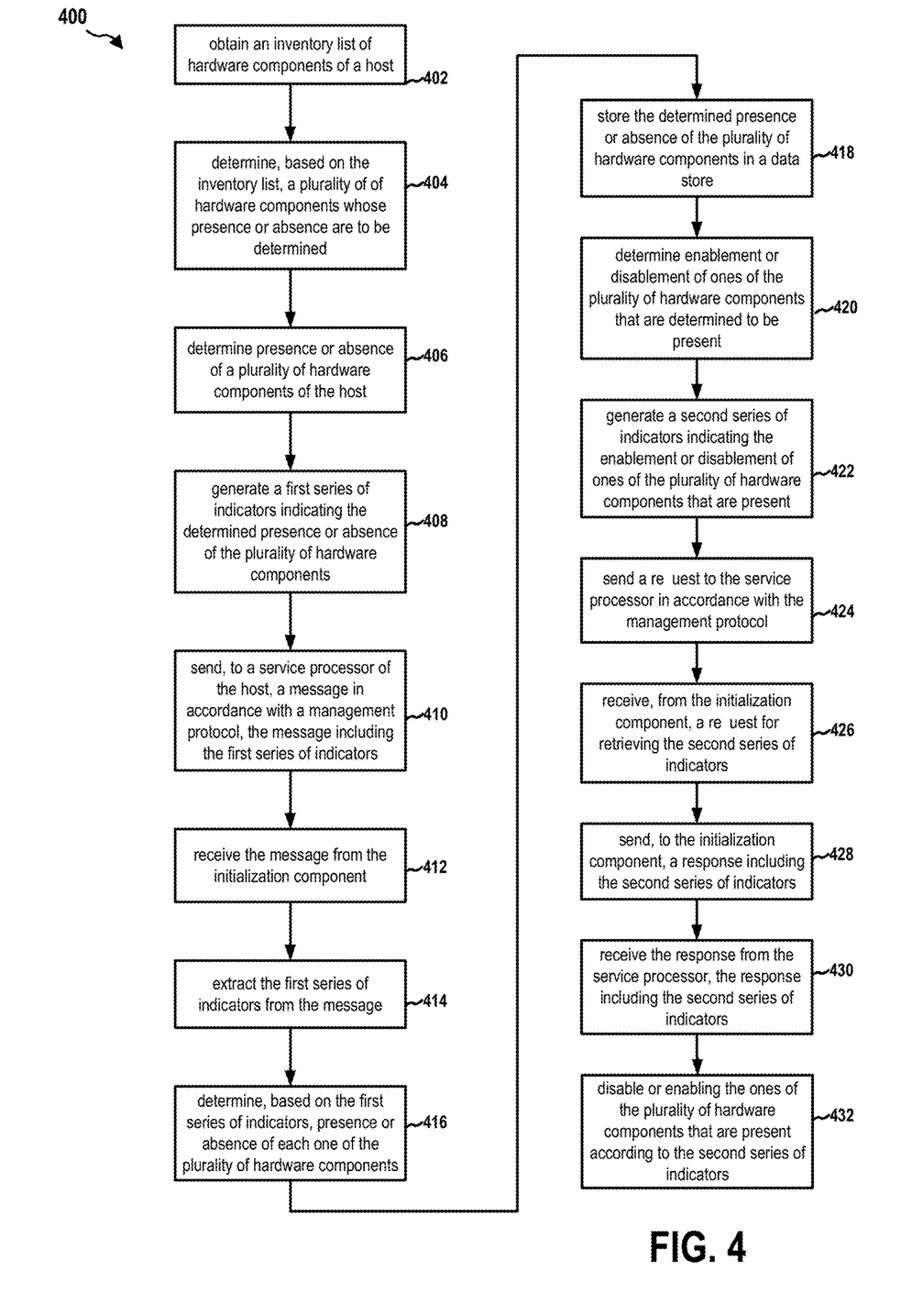
FIG. 4 is a flow chart of a method (process) for determining presence or absence as well as enablement or disablement of hardware components of a host.

FIG. 4 is a flow chart 400 of a method (process) for determining presence or absence as well as enablement or disablement of hardware components of a host. The method may be performed by a computer system (e.g., the computer system 100) including a host (e.g., the host computer 180) and a service processor (e.g., the BMC 102 and the apparatus 102'). The host includes an initialization component (e.g., the initialization component 192).

At operation 402, the initialization component obtains an inventory list of hardware components of the host. At operation 404, the initialization component determines, based on the inventory list, a plurality of hardware components (e.g., the host CPU 182, the host memory 184, the storage device 185, and the hardware components 186-1 to 186-N) whose presence or absence are to be determined. At operation 406, the initialization component determines the presence or absence of the plurality of hardware components of the host. At operation 408, the initialization component generates a first series of indicators (e.g., the presence-or-absence bitmap 320) indicating the determined presence or absence of the plurality of hardware components. At operation 410, the initialization component sends, to a service processor of the host, a message (e.g., the IPMI OEM set command) in accordance with a management protocol (e.g., IPMI). The message includes the first series of indicators.

At operation 412, the service processor receives the message from the initialization component. At operation 414, the service processor extracts the first series of indicators from the message. At operation 416, the service processor determines, based on the first series of indicators, presence or absence of each one of the plurality of hardware components. At operation 418, the service processor stores the determined presence or absence of the plurality of hardware components in a data store.

At operation 420, the service processor determines enablement or disablement of ones of the plurality of hardware components that are determined to be present. At operation 422, the service processor generates a second series of indicators (e.g., the enablement-or-disablement bitmap 330) indicating the enablement or disablement of ones of the plurality of hardware components that are present.

At operation 424, the initialization component sends a request (e.g., the IPMI OEM get command) to the service processor in accordance with the management protocol, the request being for retrieving the second series of indicators.

At operation 426, the service processor receives, from the initialization component, a request for retrieving the second series of indicators. At operation 428, the service processor sends, to the initialization component, a response (e.g., the IPMI response) including the second series of indicators.

At operation 430, the initialization component receives the response from the service processor. The response includes the second series of indicators. At operation 432, the initialization component disables or enables the ones of the plurality of hardware components that are present according to the second series of indicators. In certain configurations, at least of the first series of indicators and the second series of indicators is a bitmap.

Figure 5:
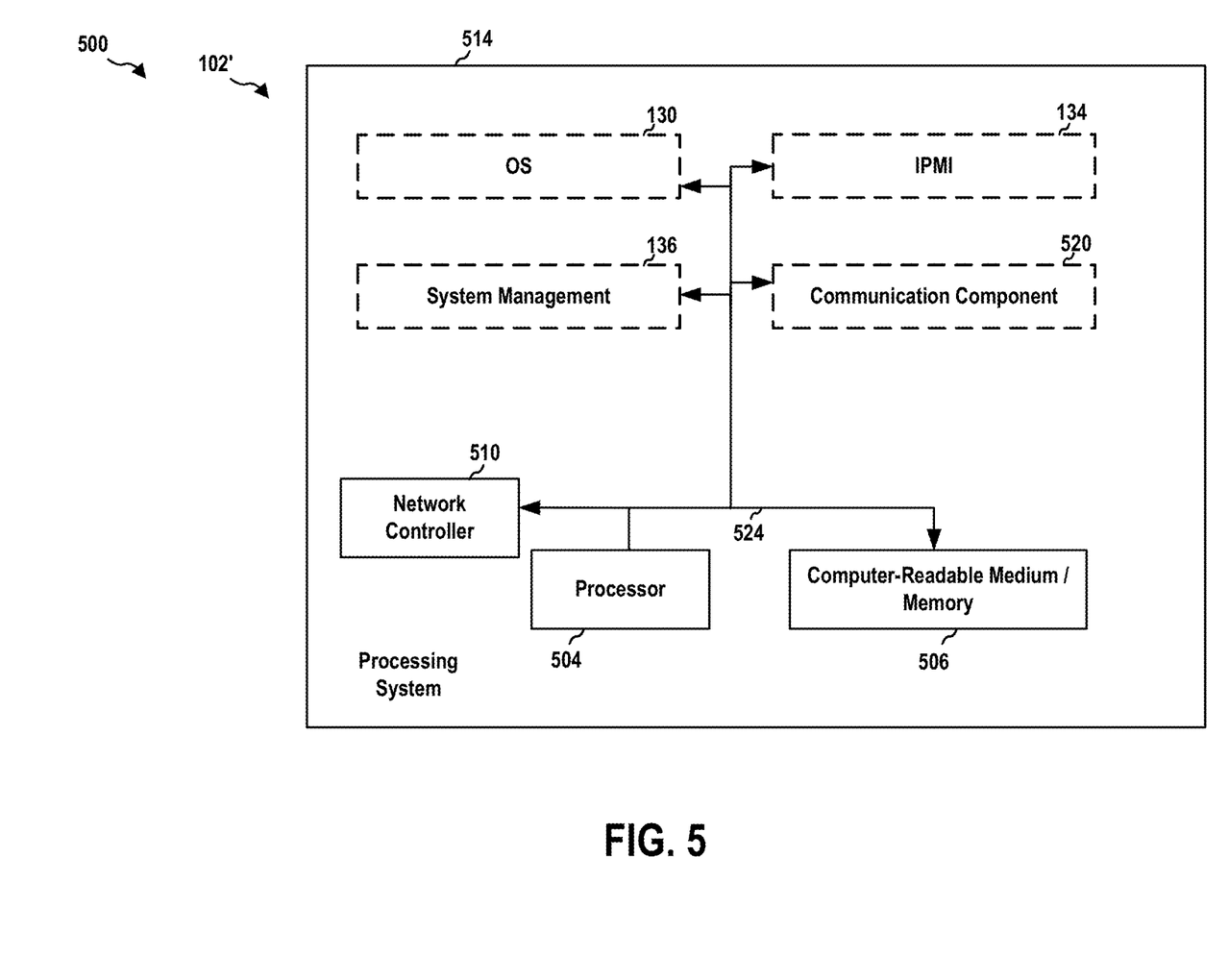
FIG. 5 is a diagram illustrating an example of a hardware implementation for an apparatus employing a processing system.

FIG. 5 is a diagram 500 illustrating an example of a hardware implementation for an apparatus 102' employing a processing system 514. The apparatus 102' may implement the BMC 102. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc.

The computer-readable medium/memory 506 may include the memory 114 and/or the storage 117. The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 102'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the OS 130, the IPMI services 134, and the system management component 136. The components may be software components running in the processor 504, resident/stored in the computer readable medium/memory 506, one or more hardware components coupled to the processor 504, or some combination thereof.

The apparatus 102' may be configured to include means for performing operations described supra referring to FIG. 4. The aforementioned means may be one or more of the aforementioned components of the apparatus 102 and/or the processing system 514 of the apparatus 102' configured to perform the functions recited by the aforementioned means.

Figure 6:
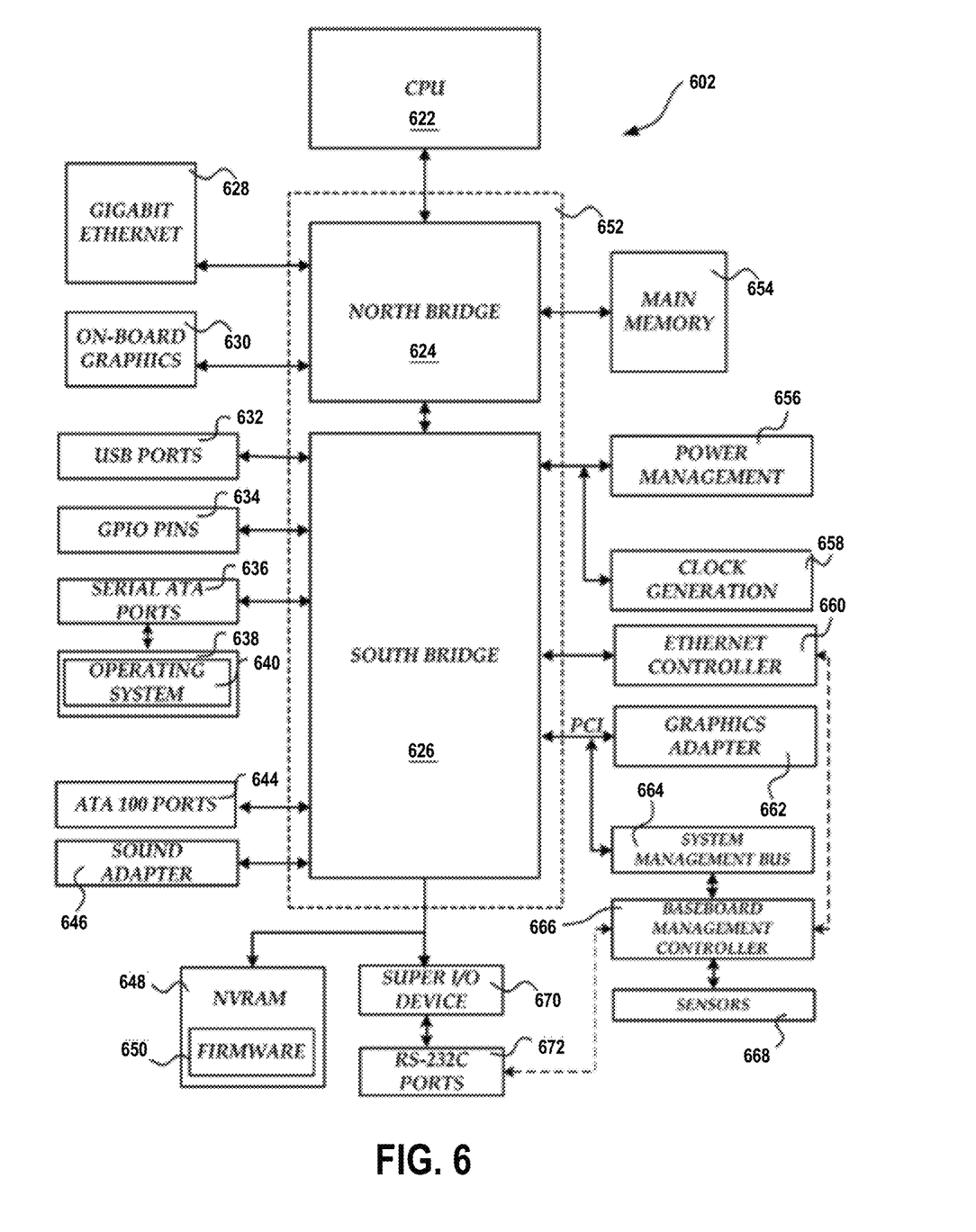
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including an initialization component of a host, comprising:
   determining, at the initialization component executed on a central processing unit (CPU) of the host and executed prior to that an operating system of the host is executed on the CPU, presence or absence of a plurality of hardware components of the host;
   generating, at the CPU, a first series of indicators indicating the determined presence or absence of the plurality of hardware components; and
   sending, from the CPU to a service processor of the host, a message in accordance with a management protocol, the message including the first series of indicators.

2. The method of claim 1, further comprising:
   obtaining an inventory list of hardware components of the host; and
   determining, based on the inventory list, the plurality of hardware components whose presence or absence are to be determined.

3. The method of claim 1, further comprising:
   sending a request to the service processor in accordance with the management protocol, the request being for retrieving a second series of indicators indicating enablement or disablement of ones of the plurality of hardware components that are present;

receiving a response from the service processor, the response including the second series of indicators; and disabling or enabling the ones of the plurality of hardware components that are present according to the second series of indicators.

4. The method of claim 1, wherein the computer system further includes the service processor, the method further comprising:

receiving the message from the initialization component;

extracting the first series of indicators from the message;

determining, based on the first series of indicators, presence or absence of each one of the plurality of hardware components; and storing the determined presence or absence of the plurality of hardware components in a data store.

5. The method of claim 4, further comprising:

determining enablement or disablement of ones of the plurality of hardware components that are determined to be present; and generating a second series of indicators indicating the enablement or disablement of ones of the plurality of hardware components that are present.

6. The method of claim 5, further comprising:

receiving, from the initialization component, a request for retrieving the second series of indicators; and sending, to the initialization component, a response including the second series of indicators.

7. A method of operating a computer system, the computer system including an initialization component of a host, comprising:

determining, at the initialization component, presence or absence of a plurality of hardware components of the host;

generating a first series of indicators indicating the determined presence or absence of the plurality of hardware components; and sending, to a service processor of the host, a message in accordance with a management protocol, the message including the first series of indicators;

wherein the computer system further includes the service processor, the method further comprising:

receiving the message from the initialization component;

extracting the first series of indicators from the message;

determining, based on the first series of indicators, presence or absence of each one of the plurality of hardware components;

storing the determined presence or absence of the plurality of hardware components in a data store;

determining enablement or disablement of ones of the plurality of hardware components that are determined to be present; and generating a second series of indicators indicating the enablement or disablement of ones of the plurality of hardware components that are present, wherein at least of the first series of indicators and the second series of indicators is a bitmap.

8. A computer system, the computer system including an initialization component of a host, comprising:

a memory; and at least one processor coupled to the memory and configured to:

determine, at the initialization component executed on a central processing unit (CPU) of the host and executed prior to that an operating system of the host is executed on the CPU, presence or absence of a plurality of hardware components of the host;

generate, at the CPU, a first series of indicators indicating the determined presence or absence of the plurality of hardware components; and send, from the CPU to a service processor of the host, a message in accordance with a management protocol, the message including the first series of indicators.

9. The computer system of claim 8, wherein the at least one processor is further configured to:

obtain an inventory list of hardware components of the host; and determine, based on the inventory list, the plurality of hardware components whose presence or absence are to be determined.

10. The computer system of claim 8, wherein the at least one processor is further configured to:

send a request to the service processor in accordance with the management protocol, the request being for retrieving a second series of indicators indicating enablement or disablement of ones of the plurality of hardware components that are present;

receive a response from the service processor, the response including the second series of indicators; and disable or enable the ones of the plurality of hardware components that are present according to the second series of indicators.

11. The computer system of claim 8, wherein the computer system further includes the service processor, wherein the at least one processor is further configured to:

receive the message from the initialization component;

extract the first series of indicators from the message;

determine, based on the first series of indicators, presence or absence of each one of the plurality of hardware components; and store the determined presence or absence of the plurality of hardware components in a data store.

12. The computer system of claim 11, wherein the at least one processor is further configured to:

determine enablement or disablement of ones of the plurality of hardware components that are determined to be present; and generate a second series of indicators indicating the enablement or disablement of ones of the plurality of hardware components that are present.

13. The computer system of claim 12, wherein the at least one processor is further configured to:

receive, from the initialization component, a request for retrieving the second series of indicators; and send, to the initialization component, a response including the second series of indicators.

14. A computer system, the computer system including an initialization component of a host, comprising:

a memory; and at least one processor coupled to the memory and configured to:

determine, at the initialization component, presence or absence of a plurality of hardware components of the host;

generate a first series of indicators indicating the determined presence or absence of the plurality of hardware components; and send, to a service processor of the host, a message in accordance with a management protocol, the message including the first series of indicators;

wherein the computer system further includes the service processor, configured to:

receive the message from the initialization component;

extract the first series of indicators from the message;
determine, based on the first series of indicators, presence or absence of each one of the plurality of hardware components; and
store the determined presence or absence of the plurality of hardware components in a data store;
wherein the at least one processor is further configured to:
determine enablement or disablement of ones of the plurality of hardware components that are determined to be present; and
generate a second series of indicators indicating the enablement or disablement of ones of the plurality of hardware components that are present,
wherein at least of the first series of indicators and the second series of indicators is a bitmap.

15. A non-transitory computer-readable medium storing computer executable code for operating a computer system, the computer system including an initialization component of a host, comprising code to:
determine, at the initialization component, presence or absence of a plurality of hardware components of the host;
generate a first series of indicators indicating the determined presence or absence of the plurality of hardware components; and
send, to a service processor of the host, a message in accordance with a management protocol, the message including the first series of indicators.

16. The non-transitory computer-readable medium of claim 15, wherein the code is further configured to:
obtain an inventory list of hardware components of the host; and
determine, based on the inventory list, the plurality of hardware components whose presence or absence are to be determined.

17. The non-transitory computer-readable medium of claim 15, wherein the code is further configured to:
send a request to the service processor in accordance with the management protocol, the request being for retrieving a second series of indicators indicating enablement or disablement of ones of the plurality of hardware components that are present;
receive a response from the service processor, the response including the second series of indicators; and
disable or enable the ones of the plurality of hardware components that are present according to the second series of indicators.

18. The non-transitory computer-readable medium of claim 15, wherein the computer system further includes the service processor, wherein the code is further configured to:
receive the message from the initialization component;
extract the first series of indicators from the message;
determine, based on the first series of indicators, presence or absence of each one of the plurality of hardware components; and
store the determined presence or absence of the plurality of hardware components in a data store.

19. The non-transitory computer-readable medium of claim 18, wherein the code is further configured to:
determine enablement or disablement of ones of the plurality of hardware components that are determined to be present; and
generate a second series of indicators indicating the enablement or disablement of ones of the plurality of hardware components that are present.

20. The non-transitory computer-readable medium of claim 19, wherein the code is further configured to:
receive, from the initialization component, a request for retrieving the second series of indicators; and
send, to the initialization component, a response including the second series of indicators.

* * * * *